(12) United States Patent
Van Langh

(10) Patent No.: US 11,491,599 B2
(45) Date of Patent: Nov. 8, 2022

(54) COOLING SYSTEM AND MACHINING DEVICE

(71) Applicant: KNOLL Maschinenbau GmbH, Bad Saulgau (DE)

(72) Inventor: Adrianus Johannes Gerardus Maria Van Langh, Helmond (NL)

(73) Assignee: KNOLL Maschinenbas GmbH, Bad Saulgat (DE)

( * ) Notice: Subject to any disclaimer, the term of this patent is extended or adjusted under 35 U.S.C. 154(b) by 1064 days.

(21) Appl. No.: 16/092,769

(22) PCT Filed: Apr. 5, 2017

(86) PCT No.: PCT/NL2017/050213
§ 371 (c)(1),
(2) Date: Oct. 11, 2018

(87) PCT Pub. No.: WO2017/179972
PCT Pub. Date: Oct. 19, 2017

(65) Prior Publication Data
US 2019/0126421 A1    May 2, 2019

(30) Foreign Application Priority Data
Apr. 12, 2016 (NL) .................................. 2016590

(51) Int. Cl.
| | | |
|---|---|---|
| *B23Q 11/10* | (2006.01) |
| *B24B 55/02* | (2006.01) |
| *B23Q 11/14* | (2006.01) |
| *B23Q 11/12* | (2006.01) |
| *B24C 5/04* | (2006.01) |
| *B05B 1/14* | (2006.01) |
| *B05B 1/34* | (2006.01) |

(52) U.S. Cl.
CPC ............ *B23Q 11/1084* (2013.01); *B05B 1/14* (2013.01); *B05B 1/34* (2013.01); *B23Q 11/126* (2013.01); *B23Q 11/14* (2013.01); *B24B 55/02* (2013.01); *B24C 5/04* (2013.01)

(58) Field of Classification Search
CPC ........... B05B 1/14; B05B 1/34; B23Q 11/084; B23Q 11/126; B23Q 11/14; B24B 55/02; B24C 5/04
USPC .... 239/463, 487–489, 553, 553.5, 548, 590, 239/590.5, 592, 593, 597; 451/53, 449, 451/450, 488
See application file for complete search history.

(56) References Cited

U.S. PATENT DOCUMENTS 775,708 A * 11/1904 Norton .................... B24B 55/02
451/450
1,118,118 A * 11/1914 Fischer .................... B05B 1/12
239/489

(Continued)

*Primary Examiner* — Steven J Ganey
(74) *Attorney, Agent, or Firm* — Patshe IP; Moshe Pinchas

(57) ABSTRACT

The present invention relates to a cooling system comprising a spray unit for spraying a coolant. The present invention further relates to a machining device which comprises a cooling system of this type. The spray unit comprises a flow guide which is coupled on one side to a chamber and is coupled on the other side to one or more channels, where the chamber, the flow guide and the plurality of channels form a closed system for spraying from the channels pressurized coolant fed to the chamber, where the flow guide, the plurality of elongated channels and the chamber are manufactured as an integral part.

11 Claims, 4 Drawing Sheets

(56) References Cited

U.S. PATENT DOCUMENTS

| | | | | |
|---|---|---|---|---|
| 7,458,532 B2* | 12/2008 | Sloan | ............... | B05B 15/65 |
| | | | | 239/592 |
| 2003/0094515 A1* | 5/2003 | Webster | ............... | B05B 1/16 |
| | | | | 239/548 |
| 2005/0051642 A1* | 3/2005 | Negoro | ............... | B05B 1/3447 |
| | | | | 239/488 |
| 2011/0168092 A1* | 7/2011 | Clark | ............... | B23K 26/34 |
| | | | | 239/553.5 |

* cited by examiner

COOLING SYSTEM AND MACHINING DEVICE

FIELD OF THE INVENTION

The invention relates to a cooling system for spraying a coolant on a work piece to be cooled, comprising:
- a reservoir for the coolant;
- a spray unit;
- a pump for pumping coolant from the reservoir to the spray unit;

the spray unit comprising:
- a chamber which has an inlet for coupling the spray unit to a pipe for the coolant coming from the reservoir, as well as an outlet;
- at least a single elongated channel having an inlet and an outlet;
- a flow guide whose one end is attached to the chamber at the outlet and whose other end is attached to the channel at the inlet, which flow guide comprises a cavity that widens starting from a coupling between the channel and the flow guide toward the chamber over a non-zero length in a direction perpendicular to a longitudinal direction of the channel.

The present invention further relates to a cooling system which is equipped with a spray unit of this type. More particularly, the invention relates to the spraying of a coolant to a contact zone between a grinding disc and a work piece to be ground by the grinding disc.

State of the Art

Cooling systems known from the state of the art comprise a spray unit and are used for applying coolant to a contact zone between a grinding disc and a work piece. The contact zone is then an area where the grinding disc and the work piece are touching during the grinding operation. A grinding disc is generally used rotating at high velocity. Grinding disc peripheral velocities of the order of 20 to 100 metres per second are not uncommon then. As a result of the grinding operation the work piece and the grinding disc will heat up in and near the contact zone. In consequence, cooling is needed.

From GB330095A is known a spray unit as defined in the preamble of claim 1, which spray unit comprises a multiplicity of parallel elongated channels spaced apart from each other as well as a chamber having on one side an opening for coupling the spray unit to a pipe for coolant.

A number of aspects are important for the cooling of the above contact zone. A first aspect is the cooling capacity that is provided by the flow of the coolant. A second aspect concerns the distance between the spray unit and the contact zone.

For efficiently cooling the contact zone it is of importance for atomization of the coolant to take place. Atomization provides a larger cooling capacity because the many droplets in the mist have a larger cooling capacity for heat absorption than a compact laminar flow of coolant. Atomization usually takes place at a certain distance reckoned from the outlet of the channels.

Furthermore, the velocity of the coolant should be sufficiently high for an efficient cooling effect. If the velocity is too low, the coolant will not succeed in penetrating the contact zone as a result of the air flow and/or over pressure caused by the grinding disc rotating at high velocity. The velocity of the coolant may be increased by increasing the pump power of the pump that is used for pumping the coolant to the spray unit.

The distance between the spray unit and the contact zone is preferably smallest possible. However, since this is not always possible in practice as a result of movements of the machine and work piece, it is necessary to increase this distance. However, installing the spray unit at a larger distance must not lead to a reduction of the cooling capacity of the spray unit.

It has turned out that when the known spray unit is utilized, the maximum distance between the spray unit and the contact zone cannot always be selected sufficiently large if a normal pump power is applied.

SUMMARY OF THE INVENTION

Therefore, it is an object of the present invention to provide a cooling system by which it is possible to efficiently utilize the spray unit at a relatively large distance from the contact zone while relatively low pump power is applied. A further object is to provide a cooling system by which it is possible to realize cost saving in that when the spray unit is installed in identical manner to the installation of the known spray unit, lower pump power can be selected.

This object is achieved by means of a spray unit as claimed in claim 1 which is characterized in that an inside of the flow guide is provided with a spiral-shaped rib or groove extending in longitudinal direction of the channel.

In an advantageous embodiment the spiral shape is provided such that the inside of the flow guide has the shape of a tuba or rope tornado. The liquid flowing through a similarly shaped flow guide forms a vortex. The inner layers of the coolant in an eddy have a much higher flow rate than the outer layers. In a vortex, velocity times the radius is constant. In theory this means that velocity in the centre of a vortex is infinite. As a result of the vortex the drops of water are stretched and the water molecules become independent so that the capacity for absorbing heat is increased. As the velocity increases so does the surface tension and morphology, so that the drops have a larger heat absorption capacity. As a result of the reduced, or non-existent, surface tension, secondary atomization may take place, which may lead to larger heat absorption capacity. These smaller water drops are capable of forcing themselves with less effort through the air flow that surrounds the grinding disc.

In a further advantageous embodiment the spiral shape is such that with a spiral shape projected on a planar surface the length of a part of the spiral that extends through a 90 degree angle is approximately 1.6 times the length of a following more narrowed part of the spiral that extends through a following 90 degree angle.

Furthermore, the channel is straight preferably extending over part of the length from the outlet onward and has a constant cross section over this part.

Furthermore, the chamber, the flow guide and the channel are preferably manufactured as an integral part and form a unit for spraying from the channel pressurized coolant fed to the chamber.

The spray unit preferably comprises a multiplicity of elongated channels arranged in parallel and spaced apart from one another, which said channel forms part of.

Furthermore, the flow guide has a cavity for each channel, which cavity widens from a coupling between that channel and the flow guide toward the chamber over a length unequal to zero in a direction perpendicular to a longitudinal direction of the channels and where the flow guide, the multiplicity of elongated channels and the chamber are manufactured as an integral part.

The flow guide and the integrally manufactured chamber, flow guide and channels provide, on the one hand, that the velocity of the coolant leaving the spray unit is increased, but, on the other hand, also the point at which atomization takes place in the flow of coolant will be situated more downstream than when the known spray unit is utilized while the same pump power is applied. In consequence, it is thus possible for the spray unit to be installed at a larger distance from the contact zone.

Said widening of the cavities is preferably continued at least to a point where cavities of adjacent channels are touching each other. Furthermore, the cavities show a substantially constant cross-sectional shape, preferably seen in longitudinal direction starting from the coupling between the channels and the flow guide and ending at the point where cavities of adjacent channels are touching each other, where the size of the cross-sectional shape is increased from the coupling to the chamber onward. The flow guide is then embodied in a solid form with the exception of the cavities mentioned above. The cross-sectional shape may then be circular although other shapes are not excluded. However, the cross-sectional shape preferably corresponds to a cross-sectional shape of the channels, which is also preferably circular.

The points where cavities of adjacent channels are touching each other are preferably identical for each pair of adjacent channels.

The flow guide may comprise a body that is tapering in a direction toward the channels. The cavities are then formed in the body and the widening of the cavities is continued to beyond the point where cavities of adjacent channels are touching each other. Beyond this point the cross-sectional shape of the cavities is no longer constant, but is also determined by the body. This achieves a highly advantageous transition between, on the one hand, the chamber and, on the other hand, the multiplicity of channels.

The flow guide, the multiplicity of elongated channels and the chamber may also be manufactured as an integral part by means of additive manufacture such as 3D printing. Other manufacturing techniques, such as injection moulding and Electric Discharge Machining called (EDM) are not excluded.

The spray unit may be made of a material from the group comprising plastics, stainless steel, aluminium or titanium, or combinations thereof.

The point at which atomization takes place may furthermore be positively influenced by utilizing channels which on an inside are provided with a spiral-shaped rib or ridge extending in longitudinal direction of the channels. This rib or ridge provides that the coolant moves at a uniform velocity and follows the rib or ridge. Contrary to the movement in a completely straight channel, the coolant at the edge of the channel will not move or at any rate move much less slowly than the coolant in the middle of the channel. Further there is less loss of velocity and the spiral-shaped rib or ridge provides that the flow continues to be laminar for an extended period of time when leaving the channels and, compared to a channel where a rib or ridge is lacking and becomes turbulent at a later instant.

By increasing or reducing the pitch of the spiral-shaped rib or ridge or groove, the spray unit may be installed further away from or just closer to the position where machining takes place and there will be a slimmer chance of contact between the spray unit and for example the work piece or parts of the grinding device itself.

The transition from laminar to turbulent flow and thus the point of atomization related to this can be adjusted for each individual grinding process by the selection of the correct pitch. The turbulent flow and more specifically the mist have a larger cooling capacity than a laminar jet because of the developed shape of drops. However, the velocity of the turbulent flow and the mist will decrease more quickly. In this respect it is observed that the transition between laminar flow and turbulent flow and between turbulent flow and mist usually takes place gradually.

By reducing the pitch and the diameter of the channel, a very fine but compact mist may be created which can very well penetrate the contact zone of the grinding disc when, for example, fine-grain grinding discs are utilized. Channel openings of several 0.1 mm may be used in this respect.

A further aspect of the invention not entailing from the state of the art is the above possibility of influencing the transition point from laminar flow to turbulent flow and thus the related atomization point by means of the pitch of the spiral-shaped rib or ridge.

The coolant is, for example, a liquid coolant preferably selected from the group consisting of oils, water-based coolants and emulsions or combinations thereof.

According to a still further aspect the present invention provides a machining device, more specifically, a grinding device, comprising a work piece holder, a tool holder and a cooling system according to the invention, where the outlet of the channel is pointed to the contact zone between work piece and tool.

BRIEF DESCRIPTION OF THE DRAWINGS

The invention will be described in more detail hereinafter while reference is made to the appended drawing figures, in which.

DETAILED DESCRIPTION OF THE DRAWINGS

Figure 1A:
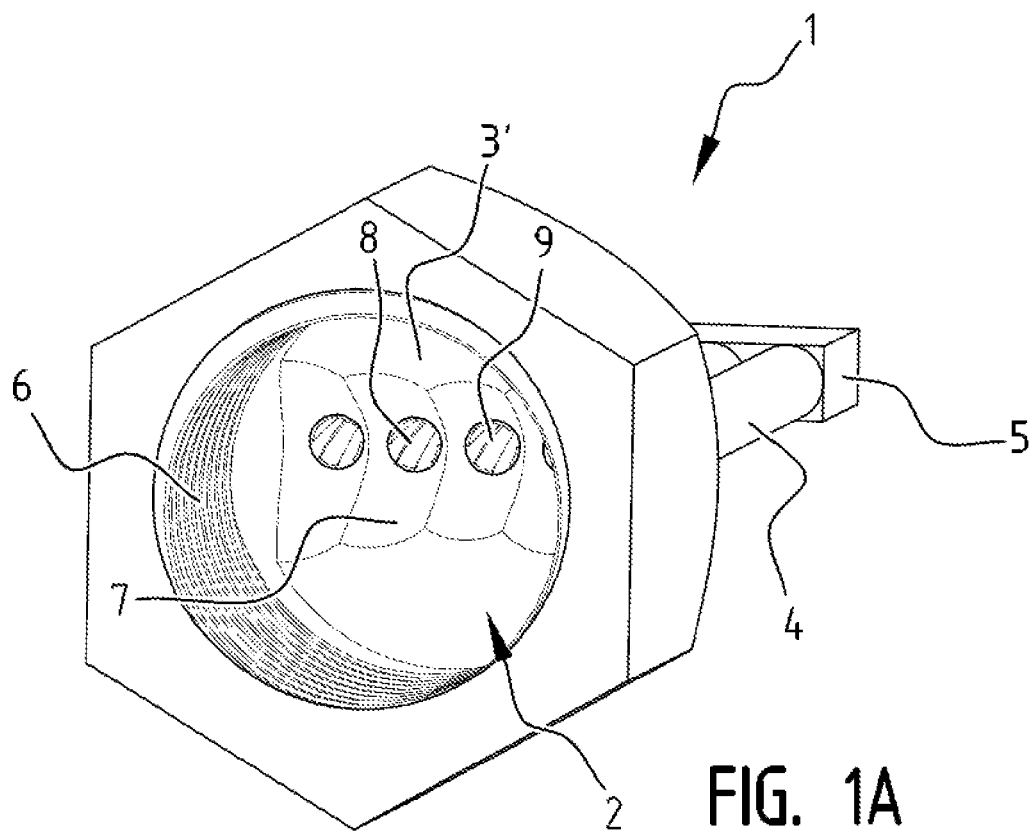
FIGS. 1A and 1B show diagrammatic views of an embodiment of a spray unit of the cooling system according to the invention.
Figure 1B:
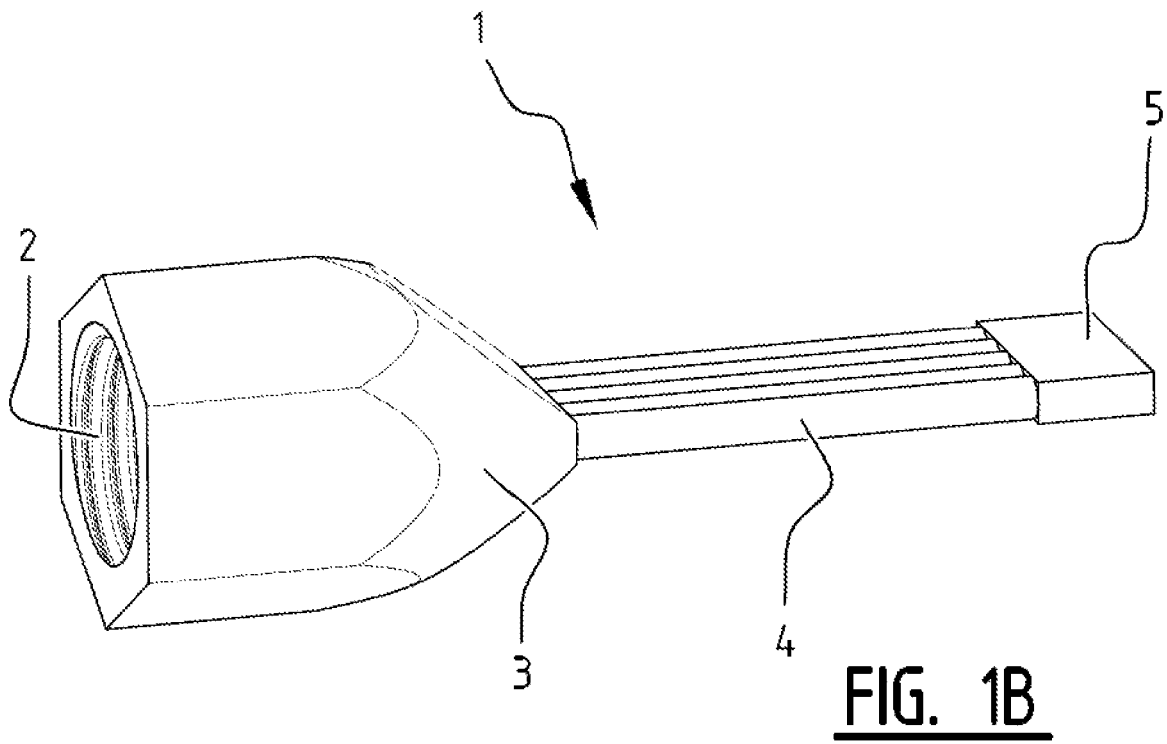

While reference is made to FIGS. 1A and 1B, a spray unit 1 according to the invention comprises a chamber 2, a flow guide 3 and a multiplicity of adjacent channels 4 which in this case are formed by in essence hollow tubes. At the end of the channels 4 a reinforcement 5 is provided as a result of which channels 4 are secured better.

On the inside of chamber 2 a thread 6 is visible by means of which spray unit 1 can be connected to a coolant pipe. However, the invention is not restricted to the use of thread; other coupling means may also be utilized.

FIG. 1A shows cavities 7 which change into openings 8 of channels 4. Furthermore, a start of a spiral-shaped rib or ridge 9 is visible, which is shown in more detail in FIG. 2.

Figure 2:
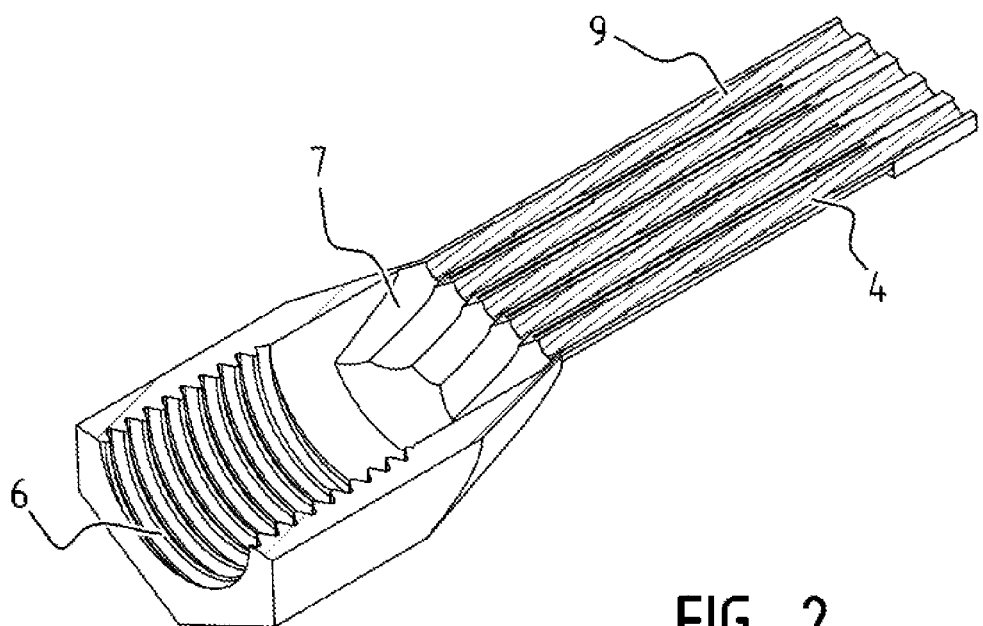
FIG. 2 shows a partly exploded cross-sectional view of the spray unit shown in FIG. 1.
Figure 3A:
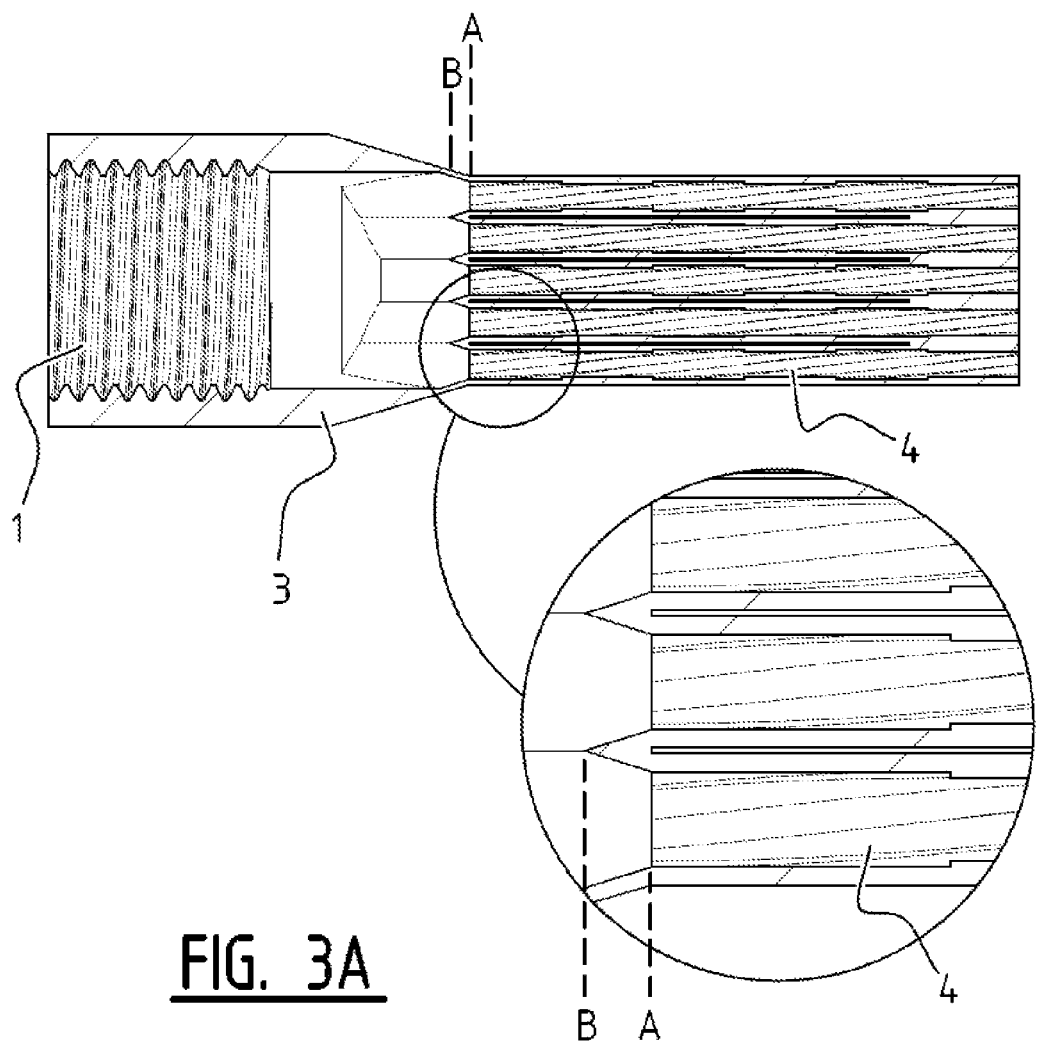
FIGS. 3A and 3B show further sectional views of the spray unit shown in FIG. 1.
Figure 3B:
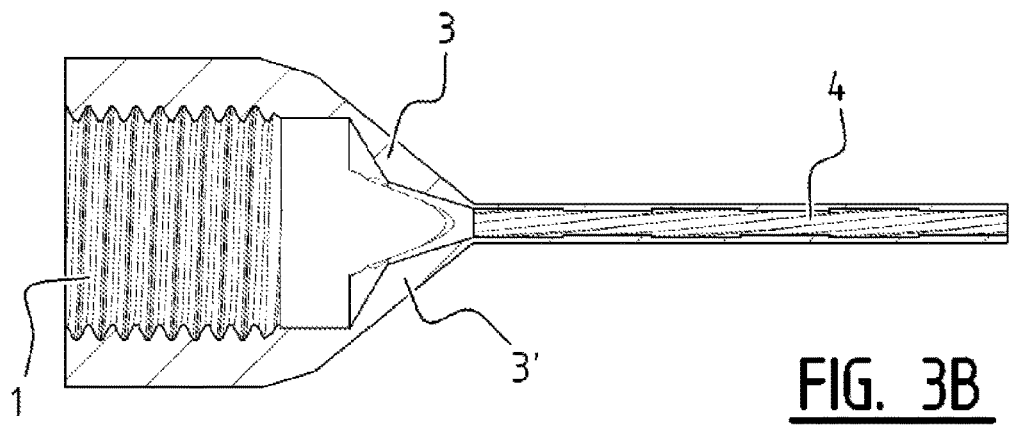

As is apparrant from FIG. 1A, FIG. 2 and the cross-sectional views of FIGS. 3A and 3B, the cavities 7 are widened from the coupling onward between flow guide 3 and channels 4, indicated in FIG. 3A by "A" up to point "B" where adjacent cavities are touching each other. Between points "A" and "B" cavities 7 have a constant circular cross section. Beyond point "B" the cross section changes because the shape is then also determined by body 3' of flow guide 3. The body 3' is then tapered in the direction of channels 4.

The result of this is a highly advantageous transition between chamber 2 and channels 4, positively affecting the transition point between laminar flow and turbulent flow and the related atomization point of the coolant leaving the spray unit.

The spray unit shown in FIGS. 1-3 is an integral part manufactured from a single material or a single combination of materials. In consequence, the transitions between the various parts are smooth and thus the above transition point may be further positively affected.

In an example of embodiment of spray unit 1 chamber 2 has an inside diameter of between 12 and 16 mm, the length over which the cavities extend is situated between 2 and 5 times the inside diameter of the channels and the channels have an inside diameter between 0.1 and 2 mm. The number of channels to be used is generally determined by the width of the grinding disc. Depending on the inside diameter of the channels, more or fewer channels may be situated beside one another for realizing a coolant flow that can cover the whole width of the grinding disc.

Figure 4:
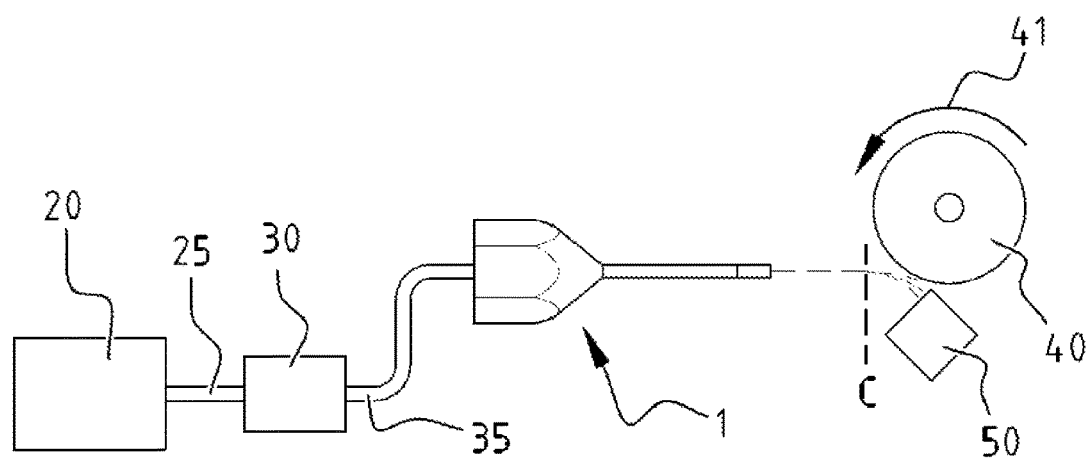
FIG. 4 shows an embodiment of the cooling system according to the invention in which the spray unit shown in FIG. 1 may be utilized.

The cooling system shown in FIG. 4 comprises a coolant reservoir 20 which is connected to a pump 30 by means of a pipe 25. Through a pipe 35 pump 30 carries the liquid coolant from coolant reservoir 20 to spray unit 1.

Spray unit 1 then squirts the coolant to a contact zone situated between a grinding disc 40 and a work piece 50 to be ground. By way of example grinding disc 40 rotates in the direction of rotation indicated by arrow 41.

FIG. 4 diagrammatically shows a point "C" where atomization of the coolant takes place. Atomization provides a larger cooling effect since the many droplets in the mist have a larger cooling capacity for absorbing heat than a compact laminar flow of coolant. Furthermore, the many droplets are better capable of penetrating the contact zone.

Figure 5:
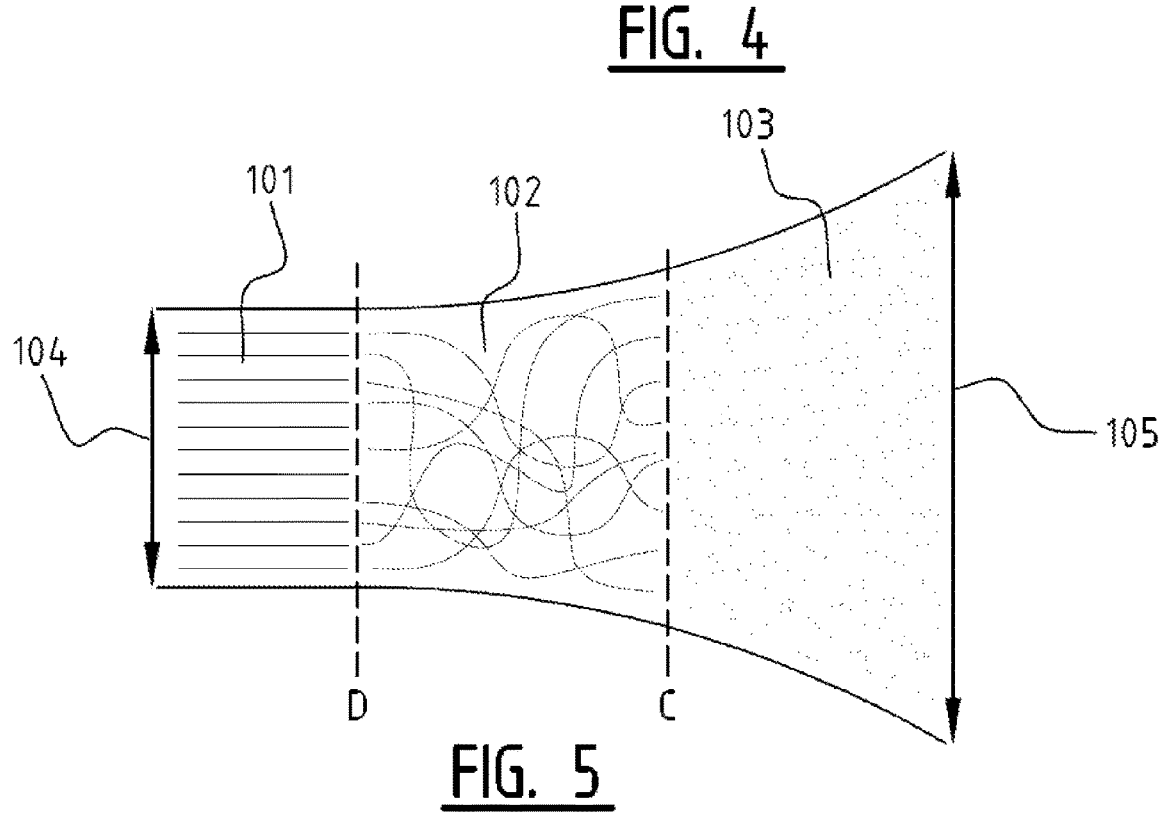
FIG. 5 shows a general structure of a coolant flow.

FIG. 5 shows a general structure of a coolant flow. The flow comprises a first part 101 in which there is a laminar flow, a second part 102 in which there is a turbulent flow and a third part 103 in which atomization takes place. In FIG. 5 point "C" indicates a separation between parts 102, 103 while point "D" indicates a separation between parts 101 and 102. In this context it is observed that in practice transitions cannot be defined in as definable a manner as suggested by FIG. 5. FIG. 5 further shows that the outside boundaries of the flow are increased in downstream direction. For example, the outside dimension of the flow when leaving the channels is 2 mm as indicated by arrow 104, whereas this dimension is 4 mm at the end of the mist indicated by arrow 105 and insofar it can be defined. The increase of the outside boundaries of the flow is effected in both directions perpendicular to the longitudinal direction of the channels.

The shape of the coolant flow provides that lower coolant velocities than customary so far are needed. The coolant velocities are, for example, less than or equal to 50% of the peripheral velocity of the grinding disc, which velocities are sufficient for the coolant to reach the contact zone as a result of the form of this flow.

From FIG. 4 is clear that if point "C" is closer to the outlet of spray unit 1, spray unit 1 is to be installed closer to grinding disc 90 and work piece 50 as a result of which spray unit 1 may touch work piece 50 when the work piece is rotated during grinding. This is also due to the fact that the atomization point must not be too far away from work piece 50 since the velocity of the coolant after atomization decreases very rapidly. If the coolant velocity is too low, the coolant will not be able to reach the contact zone owing to of the air flow and/or over-pressure caused by the grinding disc 40.

Figure 6:
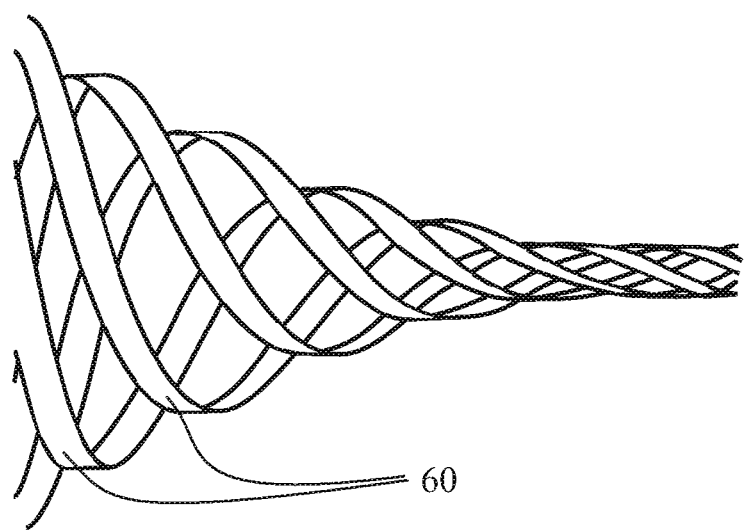
FIG. 6 shows in a three-dimensional view the course of spiral-shaped grooves in a spray unit of a further embodiment of the cooling system.
Figure 7:
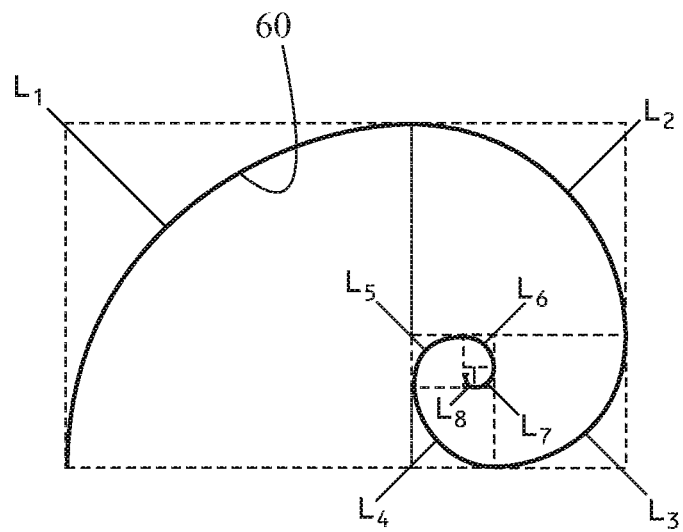
FIG. 7 shows the course of the spiral-shaped grooves shown in FIG. 6 projected on a planar surface.

The channels in the pipes and/or the cavities may be provided with a spiral-shaped groove having a Phi ratio (Golden ratio) spiral, where the end of the pipe is a straight opening whose length may vary and may be provided with a spiral without a Phi ratio. FIGS. 6 and 7 show the course of the spiral shape of a groove 60 having a Phi ratio. FIG. 6 gives a three-dimensional view of the course of the grooves 60 and FIG. 7 gives a diagrammatic view of the course of the grooves 60 as a projection on a planar surface. The length of a part $L_i$ of the spiral which extends through a 90 degree angle is here approximately 1.6 times the length $L_{i+1}$ of a following more narrowed part of the spiral which extends through a following 90 degree angle. FIG. 6 also distinctly shows the tuba shape (or shape of a (rope) tornado) of the inside wall of the flow guide.

The inner layers of water in an eddy have a much higher velocity than the outer layers. In a vortex the velocity times the jet is constant. As a result of the vortex the droplets of water are stretched and the water molecules become independent of each other thus increasing the capacity to absorb heat. These smaller water drops may penetrate in a simpler manner the air flow surrounding the grinding disc Albeit the invention has been described in the foregoing based on the drawings, it should be observed that the invention is not by any manner or means restricted to the embodiments shown in the drawings. The invention also extends to all embodiments deviating from the embodiment shown in the drawings within the framework defined by the claims.

The invention claimed is:

1. A cooling system for spraying a coolant on a work piece to be cooled, comprising:
   a reservoir for the coolant;
   a spray unit;
   a pump for pumping coolant from the reservoir to the spray unit;
   the spray unit comprising:
   a chamber which has an inlet for coupling the spray unit to a pipe for the coolant coming from the reservoir, as well as an outlet;
   at least a single elongated channel having an inlet and an outlet;
   a flow guide whose one end is attached to the chamber at the outlet and whose other end is attached to the channel at the inlet, which flow guide comprises a cavity that widens starting from a coupling between the channel and the flow guide toward the chamber over a non-zero length in a direction perpendicular to a longitudinal direction of the channel,
   wherein an inside of the flow guide is provided with a spiral-shaped rib or groove extending in the longitudinal direction of the channel.

2. A cooling system as claimed in claim 1, wherein the inside of the flow guide has the shape of a tuba or rope tornado.

3. A cooling system as claimed in claim 1, wherein the spiral shape of the groove is such that with a spiral shape projected on a planar surface the length of a part of the spiral that extends through a 90 degree angle is approximately 1.6 times the length of a following more narrowed part of the spiral that extends through a following 90 degree angle.

4. A cooling system as claimed in claim 1, wherein the channel is straight extending over part of the length from the outlet onward and has a constant cross section over this part.

5. A cooling system as claimed in claim 1, wherein the chamber, the flow guide and the channel are manufactured as an integral part and form a unit for spraying from the channel pressurized coolant fed to the chamber.

6. A cooling system as claimed in claim 1, wherein the spray unit comprises a multiplicity of elongated channels arranged in parallel and spaced apart from each other, which said channel forms part of.

7. A cooling system as claimed in claim 6, wherein said widening of the cavities is preferably continued at least to a point where cavities of adjacent channels are touching each other.

8. A cooling system as claimed in claim 7, wherein the cavities show a substantially constant cross-sectional shape seen in longitudinal direction starting from the coupling between the channels and the flow guide and ending at the point where cavities of adjacent channels are touching each other, where the size of the cross-sectional shape is increased from the coupling to the chamber onward.

9. A cooling system as claimed in claim 8, wherein the points where cavities of adjacent channels are touching each other are identical for each pair of adjacent channels.

10. A cooling system as claimed in claim 8 wherein the flow guide comprises a body that is tapering in a direction toward the channels, where the cavities are formed in the body and where the widening of the cavities is continued to beyond the point where cavities of adjacent channels are touching each other, beyond which point the cross-sectional shape of the cavities is not constant but is also determined by the body.

11. A grinding device, comprising a work piece, a tool and a cooling system, wherein the cooling system is a cooling system as claimed in claim 1, where the outlet of the channel is pointed to a contact zone between the work piece and the tool.

* * * * *